T. P. WORTHINGTON.
Apparatus for Describing Circles.
No. 211,825. Patented Jan. 28, 1879.
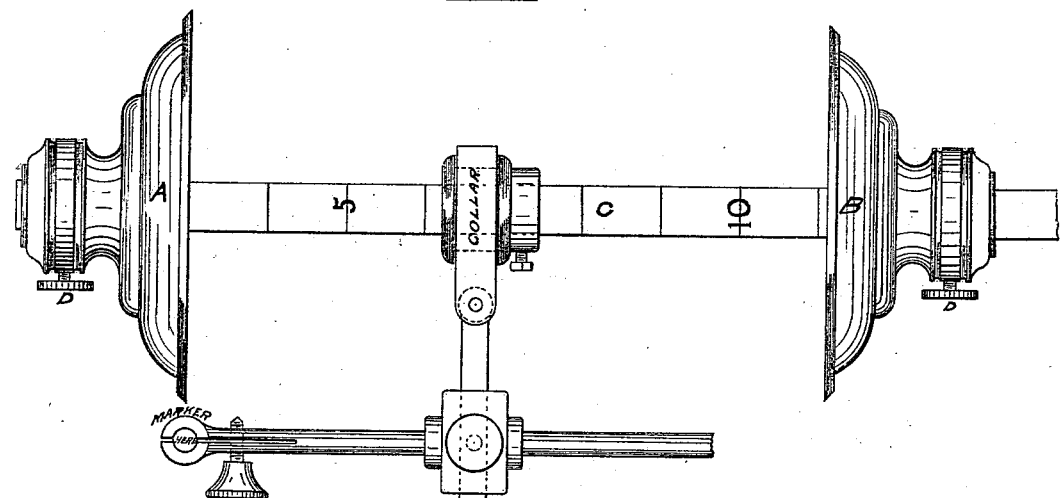
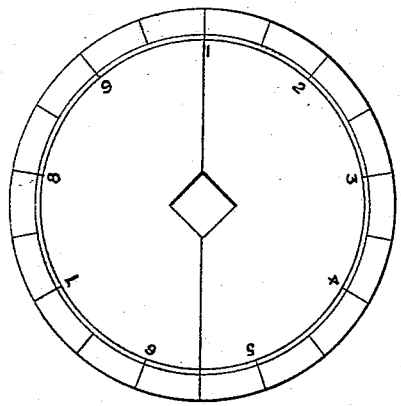
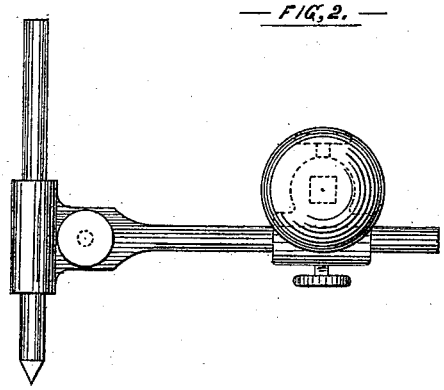
WITNESSES
INVENTOR.

UNITED STATES PATENT OFFICE.

THOMAS P. WORTHINGTON, OF BLACKPOOL, GREAT BRITAIN.

IMPROVEMENT IN APPARATUS FOR DESCRIBING CIRCLES.

Specification forming part of Letters Patent No. 211,825, dated January 28, 1879; application filed October 5, 1878.

*To all whom it may concern:*

Be it known that I, THOMAS P. WORTHINGTON, of Blackpool, England, have invented a new Improvement in Apparatus for Describing Arcs of Circles; and I do hereby declare the following, when taken in connection with the accompanying drawings and the letters of reference marked thereon, to be a full, clear, and exact description of the same, and which said drawings constitute part of this specification, and represent, in—

Figure 1, a plan view of the instrument; Fig. 2, an elevation of the marker and handle; Fig. 3, an inner face of the larger or graduated wheel.

This invention relates to a new or improved instrument for describing or drawing arcs of circles of any required radius, for giving the radial lines, and for measuring the length of the portion of the circle so described.

In practice, it is required to describe arcs of circles of considerable and definite radius in offices, workshops, and other places of limited area, when the center from which the arc is to be struck is far beyond the boundaries of such places. The object of this invention is an instrument which will describe such arcs in such limited spaces with accuracy and speed without the fixed center; and the invention consists of a pair of wheels of different diameters on a spindle, one or both adjustable, combined with a marker to trace the curve which will be traveled by said wheels when rolling freely, the radius of the curve depending upon the relative position of the wheels to each other.

The apparatus consists of two wheels, A and B, of different diameters, mounted on a spindle or axis, C, but easily adjustable at any required distance apart by means of set-screws D, or other similar means. This apparatus, when set in motion freely on a flat and level surface, will travel in a regular curve, in the same manner as a rolling cone.

The marker may be applied directly to the spindle; but as the wheels A and B are both necessarily rigid on the axis, the arrangement of the marker must be so as to allow the spindle to turn. This is best done by placing a loose collar around the spindle and attaching the marker to that collar, as seen in Fig. 1, and so that the marker will bear upon the surface or plane over which the wheels are rolled.

The radius of the curve to be drawn having been ascertained, the wheels are arranged relatively to each other so as together to form the frustum of a cone, of which the actual center of the curve to be drawn is the apex, and so that the two wheels will roll in a curved line, as if actually the frustum of such a cone. The marker following will trace the curve so traveled by the rolling wheels.

It will be readily seen that by arranging the wheels nearer together the radius will be shortened, or, farther apart, the radius will be lengthened.

The diameter of the wheels being known, the spindles may be graduated so as to indicate the exact position of the wheels for the required curve.

The circumference of the wheels being known, they may be used to accurately measure curves of any radius.

I claim—

The herein-described instrument for describing curves, consisting of the two wheels A B, of different diameters, one or both adjustable on the spindle C, combined with a marker, substantially as described.

In testimony that I claim the foregoing I have hereunto set my hand this 18th day of July, 1878.

THOS. P. WORTHINGTON.

Witnesses:
 ARTHUR B. CROSSLEY,
  *Halifax.*
 JOSHUA LISTER RUSHFORTH,
  *Huddersfield.*